Dec. 3, 1968  H. G. NADEAU ET AL  3,413,836
GEL POINT INDICATOR
Filed March 11, 1966

HERBERT G. NADEAU
PAUL H. WASZECIAK
INVENTORS.

BY *Denis A Lith*
AGENT

United States Patent Office 3,413,836
Patented Dec. 3, 1968

3,413,836
GEL POINT INDICATOR
Herbert G. Nadeau, North Haven, and Paul H. Waszeciak, Hamden, Conn., assignors to The Upjohn Company, Kalamazoo, Mich., a corporation of Delaware
Filed Mar. 11, 1966, Ser. No. 533,591
7 Claims. (Cl. 73—17)

ABSTRACT OF THE DISCLOSURE

An apparatus for determining gel point and like changes from liquid to solid (e.g., freezing point) is provided. Two tubes, one having its lower end beneath the surface of a sample of the test fluid, the second having its lower end beneath the surface of a reference fluid, are connected at their upper ends to each other and to a bellows or like means for alternately compressing and decompressing the gas sealed in the tubes. The liquid level within the two tubes is thereby caused to oscillate. When the change from liquid to solid occurs in the test sample the magnitude of oscillation of fluid in the tube disposed in the reference fluid suddenly doubles. The latter change in oscillation is observed manually or by a sensing device (e.g., capacitance operative relay). The test fluid is maintained at constant temperature for determination of gel time or is subjected to controlled heating or cooling where the change of state in the test fluid is caused by temperature change.

---

This invention relates to novel means for the determination of a change of state in an initially fluid sample and is more particularly concerned with the means and a method for determination of the gel point of solutions which undergo gelation.

The determination of a change of state in an initially fluid sample provides useful information pertinent to the control of processing conditions in a variety of industries. One such change of state is the transformation from a fluid state to that of a gel. The latter can be defined in broad terms as a fluid system exhibiting incipient rigidity. Examples of such transformations are the gelation of solutions of cellulose esters in solvents, which solutions are used in making films and coatings, and the gelation of polymers such as polyurethanes, polyester-styrene graft copolymers and the like. A determination of the time, after the system components are brought together, at which gelation takes place and/or the conditions of temperature and the like at which the gelation takes place, is generally made as a routine production batch control. In such systems it is essential to maintain uniform characteristics in the end product and to have available, particularly in the preparation of polymers, surface coatings and the like, accurate information as to the time within which a system will remain in a fluid, workable state after the steps leading to gelation have been set in motion.

The gel point is generally defined as the point at which the first "structurally insoluble gel" apppears; see, Flory, J. Am. Chem. Soc. 63, 3083, 1941. In the case of polymer formation the gel point corresponds to the point at which the formation of polymer has progressed to the stage at which a cross-linked space lattice network has been formed.

Previous methods employed for the determination of gel point have generally involved the measurement of resistance to passage of a solid object through the liquid subject to gelation. These methods have limited accuracy and sensitivity due to the time lag involved in detecting and recording the changed resistance to passage of the object through the liquid under test.

It is an object of this invention to provide a novel, highly sensitive and accurate method of determining gel point and like changes of state in an initially fluid sample. It is a further object to provide such a method which is readily adapted for use in making routine, semi-automatic, determinations of gel point and like changes of state. These objects are attained by use of the novel apparatus of this invention.

The present invention comprises an apparatus for detecting a change of state in an initially liquid sample in which apparatus there is the combination which comprises:

(i) A first container for said initially liquid sample;

(ii) A second container for reference liquid having comparable density to that of the initially liquid sample;

(iii) Tubes disposed substantially vertically in each of said first and second containers so that the lower end of each tube is beneath the surface of the liquid in said container and the upper end of each tube is connected in parallel to a sealed gaseous system;

(iv) Reciprocating means adapted alternatively to compress and decompress the gas in said sealed gaseous system thereby causing the liquid level within each of said tubes in said first and second containers to oscillate between points situated at different heights with respect to the level of liquid outside the tubes in said first and second containers so long as the initially liquid sample in said first container remains fluid; and (v) Means for detecting a change in amplitude of oscillatory motion of the reference fluid within the tube in said second container said change indicating a change of state in said initially fluid sample with consequent failure of oscillatory movement of the latter within the tube in said first container.

As will be discussed in more detail below the apparatus and process of the invention can be used to determine quickly and accurately, in a simple manner, the point at which a change of state in an initially fluid sample takes place. As will be apparent to those skilled in the art, the apparatus and process can be used to determine changes of state which take place while the fluid sample is maintained at a substantially constant temperature. Said apparatus and method can also be used to determine changes of state which occur by reason of a change in temperature, such as crystallization of a fluid, gelation on cooling solutions of cellulose acetate, and the like. Thus, the container for the initially liquid sample in said apparatus can be surrounded by a bath which enables the temperature to be maintained substantially constant or varied in any manner.

The process and apparatus of the invention will now be described with respect to a specific embodiment thereof. It is to be understood that this embodiment is given for purposes of illustration only and that the invention is not limited thereby. Various modifications which can be introduced in said embodiment will be discussed below and/or will be obvious to one skilled in the art.

Figure 1:
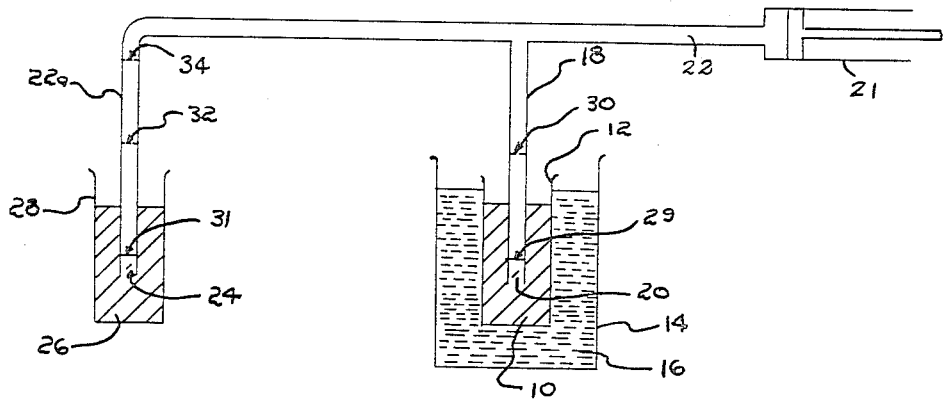
FIGURE 1 is a schematic representation of a specific embodiment of the invention.

In FIGURE 1 the initially liquid sample 10 of the fluid in which the change of state is to be observed is confined in a suitable container 12. The latter can take a variety of forms such as an open ended tube, a conical flask, a spherical flask, and the like. The container 12 can be constructed of any suitable material such as glass, plastic, metal, for example, brass, steel, copper, and the like, provided that the material is capable of withstanding any temperature changes to which the fluid sample 10 may be subjected. The container 12 is advantageously contained in a heating bath 14 containing a suitable liquid heat conducting medium 16. The heating medium 16 is so chosen that its boiling point is below the maximum temperature at which it will be heated. Any suitable fluid commonly used for this purpose can be employed. Examples of such fluids are: paraffin oil, tetralin, Decalin, silicones and the like.

The heating bath 14 and its contents can be provided with heating means either internally or externally. For example, an electrically operated immersion heater can be placed in the heating fluid 16 or, alternatively, the heating bath 14 can be placed on a heating element in which the source of heat is electrical or is provided by an open flame. Such heating means can be thermostatically controlled in the manner well known in the art and the temperature of the heating fluid 16 can, if desired, be maintained uniform throughout by suitable stirrer means.

A hollow tube 18 is disposed so that its open end 20 is beneath the surface of the fluid sample 10 in the container 12. Advantageously the tube 18 is disposed so that its longitudinal axis is substantially vertical with respect to the surface of the fluid 10. If desired, said tube 18 can be disposed at any other convenient angle with respect to the surface of the fluid 10 provided always that the fluid within said tube 18 is free to rise and fall therein in response to fluctuating pressure. At its other end the tube 18 is connected, for example by means of a T junction or other suitable type of junction, to a second hollow tube 22 in such a manner that there is free communication between the interior of tube 18 and that of tube 22. The tubes 18 and 22 can be formed of any suitable material such as glass, plastic, metal, for example, brass, copper and the like. Each of the tubes can be fabricated from a single continuous section of tubing or can be fabricated by joining two or more sections of tube made of the same or different materials in a manner which will be obvious to one skilled in the art. The internal and external dimensions of said tubes can vary within wide limits subject to the considerations discussed below.

The tube 22 has an extension 22A with an open end 24 which latter is disposed beneath the surface of reference fluid 26 contained in a siutable container 28. The reference fluid 26 can be any fluid which is not subject to a change of state under the conditions of the test and which preferably has a density approximating that of the test sample fluid 10 in container 12. Where the fluid sample 10 has a density approximating unity the reference fluid 26 is advantageously a fluid such as water, or a mixture of water and an aliphatic glycol such as ethylene glycol, propylene glycol, and the like which has a density approximating 1. Where the test fluid 10 has a density higher than unity the reference fluid 26 has a correspondingly higher density and advantageously can be a halogenated hydrocarbon or the like with appropriate density. Advantageously the tube 22A is disposed with its longitudinal axis substantially vertical to the surface of the reference fluid 26 but said tube can be disposed at other convenient angles if so desired.

The other end of tube 22 is connected to a reciprocating pump 21. Any such suitable pump can be employed for this purpose. A particularly convenient form of reciprocating pump 21 is comprised of the barrel and plunger of a standard hypodermic syringe, the plunger being attached to suitable means for moving the plunger continuously in a reciprocating manner in the barrel. Examples of such means are reciprocating linear motion stirrers, cranks and the like devices well known in the art for this purpose. Alternatively, the plunger of the reciprocating means 21 can be operated by hand.

Operation of the pump 21 causes the gas confined within the system defined by the interior of tubes 18, 22, and 22a, and sealed by the fluid sample 10 and reference fluid 26, to be subjected alternately to comperssion and decompression. In the compression phase of pump 21 the level of fluids 10 and 26 in the interior of tubes 18 and 22a respectively, will be lowered with respect to the level of said fluids outside said tubes. In the decompression phase of pump 21 the level of fluids 10 and 26 in the interior of tubes 18 and 22a, respectively, will be correspondingly raised. As the pump goes through its repeating cycles of compression and decompression the level of fluid in each of the tubes 18 and 22a will oscillate between two extreme levels corresponding to the maximum compression and maximum decompression cycles of the pump 21. By appropriate adjustment of the initial volume of gas confined in the system, for example by means of one or more valves situated at a convenient point in tube 22, the maximum and minimum height of fluid in the tubes 18 and 22a can be so controlled that they are situated approximately equiditsantly above and below the level of fluid in the outer containers 12 and 28.

It will be understood, however, that it is merely advantageous and not essential that the maximum and minimum heights of fluid in tubes 18 and 22a be situated approximately equidistantly above and below the level of fluid in containers 12 and 28. Thus, if desired, both heights could be below the latter level or the two heights could be disposed asymmetrically with respect to the level of fluid in containers 12 and 28. The only limiting factor in determining these heights is that the maximum level attained by the fluid in tube 22a, at the time at which the change of state in fluid sample 10 takes place, be above the level of fluid container 28.

The amplitude of the oscillation of fluids within the tubes 18 and 22a can be controlled as desired by appropriate choice of the capacity of the pump and the internal dimensions and capacity of the tubes 18, 22 and 22a. Advantageously said amplitude of oscillation is within the range of about 0.5 to about 3 inches but these limits are not critical and greater or smaller amplitudes can be employed if desired. The above limits merely represent the distances which have been found convenient in practice to enable the operator to make the necessary observations as to change in these levels.

The exact internal and external dimensions of the tubes 18 and 22a and of the containers 12 and 28 are not critical. For most purposes it has been found convenient to employ tubes with an internal diameter from about 10 to about 15 millimeters. Similarly it has been found convenient for most purposes to employ as containers 12 and 28 cylindrical tubes which have an internal diameter about 1.4 times the internal diameter of the tubes 18 and 22a. The internal and external dimensions of the tubes 18 and 22a need not necessarily be identical or uniform. The internal and external configurations of the tubes 18 and 22a can be varied without detracting from the performance of the device. Said tubes have been shown as linear and substantially cylindrical in cross section for purposes of simple illustration only. As will be obvious to one skilled in the art said tubes can be shaped in any convenient manner to meet the needs of other forms of the device of the invention.

In using the embodiment of the invention described above for the determination of change of state which occurs on maintaining an initially fluid sample 10 at constant temperature the procedure is advantageously as follows.

Usually the process which initiates the change of state involves a chemical reaction which is set in progress by mixing two or more reactants. The mixture of reactants is preferably made outside the container 12 and a sample 10 of the mixture is transferred as rapidly as possible to said container 12. The bath 14 with heating fluid 16 is maintained at the desired temperature. If desired, the fluid 10 in the container 12 can be stirred by mechanical means but in practice it is found that sufficient agitation is provided by the motion of the fluid in the tube 18 to avoid the necessity of providing other forms of agitation.

As previously stated the reference fluid 26 is so chosen that its density approximates that of the initially liquid sample 10. With the sample 10 in the container 12 the volume of gas enclosed in the system is advantageously adjusted so that the median point of the oscillatory motion of the level of fluids within the tubes 18 and 22a corresponds approximately to the outside level of these fluids in the containers 12 and 28. This adjustment can be done by simple manipulation of the reciprocating means. For example, where the reciprocating means is in the form of a plunger and barrel, the median position of the plunger in the barrel can be adjusted in an appropriate manner. Alternatively, the adjustment can be made by removing or introducing gas into the system by means of a valve or like means disposed at a suitable point in tube 22. Said valve means can also be used to replace air enclosed within the system by an inert gas such as nitrogen, neon, argon, and the like, particularly in the case of fluid samples 10 which are subject to modification upon exposure to air.

As set forth above the adjustment of volume of gas in the system to give the above position for median point of the oscillatory motion of fluid levels in 18 and 22a is advantageous but not essential. Other median point positions above and below the level of fluid in containers 12 and 28 can be employed subject to the limitation that the abnormal maximum, attained by the fluid in tube 22a at the time of change of state in fluid sample 10, be above the level of fluid in container 28.

The above adjustment of volume within the system is generally carried out as rapidly as possible after which the reciprocating means 21 is set into operation. The levels 29 and 31 of liquids in the tubes 18 and 22a as shown in the illustrative embodiment of FIGURE 1 represent approximately the lowest point of depression of said levels below the corresponding level of fluid in the containers 12 and 28, respectively, i.e. the reciprocating means is illustrated with the piston at the height of the compression stroke. At the top of the decompression stroke of the reciprocating means 21 the liquid levels in tubes 18 and 22a rise above the surface of the liquids in the outer portion of the containers 12 and 28 to a point shown in dotted lines 30 in tube 18 and 32 in tube 22a. The levels of the liquids in tubes 18 and 22a will thereafter oscillate between the high points 30 and 32 and low points 29 and 31 in said tubes in harmony with the strokes of reciprocating means 21. The frequency of oscillation can vary within wide limits. Preferably the frequency of oscillation is between 15 cycles per minute and 30 cycles per minute depending upon the sensitivity required of the instrument.

The oscillatory motion of the fluid levels inside the tubes 18 and 22a continues in harmony with the strokes of reciprocating means 21 until the point is reached at which the awaited change of state in the fluid sample 10 occurs. At this point the liquid in tube 18 abruptly ceases to oscillate due to the change of state and resulting loss of fluidity in sample 10. As a consequence the distance travelled by the level of reference fluid 26 in tube 22a increases to approximately twice its normal value and reaches a height represented by 34. Hence the point at which the change of state occurs in fluid 10 can be detected by observation of the behavior of the level of reference fluid 26 in tube 22a.

This observation can be carried out visually if necessary. Advantageously the observation is carried out by means of a suitable sensing device. This device can take a number of forms well known in the art for such purposes. For example, the rise of the reference fluid 26 inside tube 22a to the abnormal level 34, indicating the change of state in reference fluid 10, can serve to interrupt the circuit in a capacitance operative relay.

Where such a device is employed the reference fluid 26 is advantageously one having a high dielectric constant. An electrically operated timer can be incorporated in the circuit which is broken in the aforesaid manner. Hence by starting the timer at the time at which the reactants are brought together initially to form sample 10, the time interval between this initial mixing and the final change of state can be determined and recorded automatically. Alternatively or additionally the breaking of the relay can be used to activate an alarm system to indicate to the operator that the required end point has been reached.

An alternative means of automatically indicating and recording the attainment of the level 34 by the reference fluid 26 in the tube 22a is as follows. A pair of electrodes maintained at a potential difference is inserted in tube 22a at the point represented by 34. An electrically conductive fluid is chosen as the reference fluid 26. When the level of reference fluid 26 reaches the point 34 in tube 22a a circuit is completed between the aforesaid electrodes. The completion of the circuit can be used to activate a relay which in turn serves to halt a timing mechanism or to record the time appropriately on a recording instrument. Other means of detecting the abnormal rise of fluid 26 in tube 22a to the level represented by 34 will be obvious to one skilled in the art.

When employing the device shown in FIGURE 1 to determine a change of state such as solidification, crystallization and the like which occurs when the liquid sample 10 is subjected to a lowering of temperature, the mode of operation of the device is substantially as set forth above, the only material change being the gradual lowering of the temperature of the fluid 16 in the bath 14. In such cases it is merely necessary to determine the temperature at which the change of state takes place and the various methods outlined above to detect abnormal rise of fluid 26 in the tube 22a can be employed for this purpose.

In a modification of the device illustrated in FIGURE 1 the reciprocating means 21 takes the form of bellows. Preferably the bellows is fabricated of resilient plastic material, flexible metal sheeting and the like, and is constructed in such a way that it rapidly returns to its normal state after compression. A preferred form of bellows is that constructed in the form of a cylinder provided with concertina type walls which enable the bellows to be compressed in the direction of its longitudinal axis by pressure on the base of the cylinder. The bellows can be provided with suitable means for alternate compression and release. For example where said bellows takes the concertina like shape discussed above said bellows can be mounted in a housing which is provided with a plate mounted on an arm pivotally attached to said housing and positioned so that said plate is caused, for example using a cam operated mechanism operating against the action of a return spring, alternately and continuously to engage (and compress) the bellows and then disengage said bellows. The periodicity of the compression and decompression of the bellows can be adjusted as desired, the preferred rate being that set forth above for the previous embodiments of reciprocating means 21.

Figure 2:
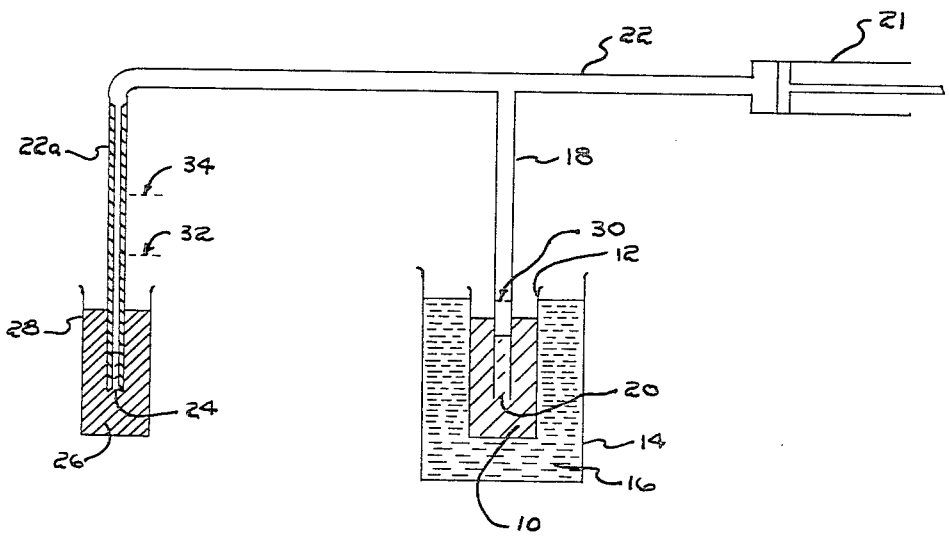
FIGURE 2 is a schematic representation of a modification of the embodiment shown in FIGURE 1 showing the use of a capillary tube in the reference fluid container.

In FIGURE 2 there is shown a further modification of the device of FIGURE 1. The device of FIGURE 2 is substantially the same as that shown in FIGURE 1 with the exception that the tube 22a in FIGURE 2 takes the form of a capillary tube. The mode of operation of the device of FIGURE 2 is the same in all respects as that shown in FIGURE 1. The use of the capillary tube 22a results in an oscillatory movement of the fluid within that tube 22a which has an amplitude several times greater than that of the corresponding liquid 10 in tube 18. In this way the sensitivity of the device is increased and in addition the capacity of the reciprocating means 21 can be significantly reduced. Thus, where reciprocating means 21 comprises a piston moving in a barrel the displacement of the piston within the barrel can be reduced in the embodiment shown in FIGURE 2 as compared with that of FIGURE 1.

As will be obvious to one skilled in the art the construction and mode of operation of the devices shown in FIGURE 1 and FIGURE 2 can be modified in various ways without detracting from the overall efficiency of the devices. For example, by connecting a series of tubes and fluid sample containers corresponding to tube 18 and container 12 in parallel in the closed gas system it is possible to carry out two or more determinations on the sample 10. The embodiments shown in FIGURES 1 and 2 are given for purposes of illustration only and it is to be understood that the invention is not limited to these specific embodiments so shown.

As previously discussed the apparatus of the invention can be used to determine a wide variety of changes of state from an initially liquid state including the determination of the solidification or crystallization point of a liquid and the gel point of a system subject to gelation. In a particularly useful application, the device of the invention can be used to determine the gel point of polyurethane systems. Such systems are generally prepared by interaction of a polyisocyanate and a polyol in accordance with methods well known in the art; see, for example, Saunders et al., Polyurethanes, Part II, Chemistry and Technology, Interscience Publishers, New York 1964.

It has been found that the gel point of polyurethane reaction mixes, usually determined in solution in a solvent such as a mixture of dimethylformamide and toluene, is a characteristic property of said mixes. It can be used as an analytical tool for routine control of reproducibility of behavior of such systems and also as a tool for investigating the effect of various factors such as change of catalyst, variation in proportion of ingredients and the like, in both cellular and non-cellular systems. The apparatus and process of the present invention provide a means of determining the gel point of this type of system with a degree of accuracy, simplicity, and reproducibility not provided by any of the devices hitherto known.

We claim:

1. In an apparatus for detecting a change of state in an initially liquid sample said change of state being induced by temperature change in said sample the combination which comprises:
   (i) a first container for said initially liquid sample;
   (ii) a second container for a reference liquid having comparable density to that of the initially liquid sample;
   (iii) tubes disposed substantially vertically in each of said first and second containers so that the lower end of each tube is beneath the surface of the liquid in said container and the upper end of each tube is connected in parallel to a sealed gaseous system;
   (iv) reciprocating means adapted alternately to compress and decompress the gas in said sealed gaseous system thereby causing the liquid level within each of said tubes in said first and second containers to oscillate between points situated at different heights with respect to the level of liquid outside the tubes in said first and second containers so long as the initially liquid sample in said first container remains fluid;
   (v) means for detecting a change in amplitude of oscillatory motion of the reference fluid within the tube in said second container said change indicating a change of state in said initially fluid sample with consequent failure of oscillatory movement of the latter within the tube in said first container; and
   (vi) means for controlling the temperature of the initially liquid sample in said first container.

2. An apparatus according to claim 1 wherein the points between which the liquids in the tubes in said first and second containers oscillate are such that the median point of oscillation corresponds approximately to the fluid level in said containers.

3. An apparatus according to claim 1 wherein the portion of the tube within which the reference fluid travels is a capillary tube.

4. An apparatus for detecting the gel point of a solution which undergoes gelation comprising in combination:
   (i) a first container for solution subject to gelation;
   (ii) a second container for a reference liquid having comparable density to that of the solution subject to gelation;
   (iii) tubes disposed substantially vertically in each of said first and second containers so that the lower end of each tube is beneath the surface of the liquid in said container and the upper end of each tube is connected in parallel to a sealed gaseous system;
   (iv) reciprocating means adapted alternately to compress and decompress the gas in said sealed gaseous system thereby causing the liquid level within each of said tubes in said first and second containers to oscillate between points situated at different heights with respect to the level of liquid outside the tubes in said first and second containers so long as the initially liquid sample in said first container remains fluid; and
   (v) means for detecting a change in amplitude of oscillatory motion of the reference fluid within the tube in said second container said change indicating a change of state in said initially fluid sample with consequent failure of oscillatory motion of the latter within the tube in said first container.

5. An apparatus according to claim 4 which also comprises means for controlling the temperature of the solution subject to gelation.

6. An apparatus according to claim 4 wherein the portion of the tube within which the reference fluid travels is a capillary tube.

7. An apparatus according to claim 4 wherein the points between which the liquids in the tubes in said first and second containers oscillate are such that the median point of oscillation corresponds approximately to the fluid level in said containers.

References Cited

UNITED STATES PATENTS

| | | | |
|---|---|---|---|
| 2,423,687 | 7/1947 | Davis et al. | 73—17 |
| 2,952,152 | 9/1960 | Fisher et al. | 73—17 |
| 3,122,911 | 3/1964 | Conklin | 73—17 |
| 3,122,912 | 3/1964 | O'Neill et al. | 73—17 |

JAMES J. GILL, *Primary Examiner.*

EDDIE E. SCOTT, *Assistant Examiner.*